United States Patent
Oh et al.

(10) Patent No.: US 11,307,578 B2
(45) Date of Patent: Apr. 19, 2022

(54) MANUAL DRIVE CHANGING NOTIFICATION APPARATUS AND METHOD OF VEHICLE AND VEHICLE INCLUDING THE SAME

(71) Applicants: Hyundai Motor Company, Seoul (KR); KIA Motors Corporation, Seoul (KR)

(72) Inventors: Dong In Oh, Hwaseong-si (KR); Joon Young Kim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 259 days.

(21) Appl. No.: 16/504,611

(22) Filed: Jul. 8, 2019

(65) Prior Publication Data
US 2020/0341464 A1 Oct. 29, 2020

(30) Foreign Application Priority Data
Apr. 24, 2019 (KR) ........................ 10-2019-0047668

(51) Int. Cl.
| | |
|---|---|
| *G05D 1/00* | (2006.01) |
| *H04W 24/08* | (2009.01) |
| *B60W 50/14* | (2020.01) |
| *G05D 1/02* | (2020.01) |
| *G06F 16/25* | (2019.01) |

(Continued)

(52) U.S. Cl.
CPC .......... *G05D 1/0061* (2013.01); *B60W 50/14* (2013.01); *G05D 1/0088* (2013.01); *G05D 1/0276* (2013.01); *G06F 16/258* (2019.01); *H04W 24/08* (2013.01); *B60W 2050/0026* (2013.01); *B60W 2050/0043* (2013.01);
(Continued)

(58) Field of Classification Search
CPC .. G05D 1/0061; G05D 1/0088; G05D 1/0276; G05D 2201/0213; G05D 1/0285; H04W 24/08; H04W 4/46; H04W 4/40; B60W 50/14; B60W 2556/65; B60W 2050/143; B60W 2050/0043; B60W 2050/0026; B60W 60/0053; B60W 30/182; B60W 50/082; B60W 30/14; B60W 2556/45; G06F 16/258; B60Y 2400/90
See application file for complete search history.

(56) References Cited

U.S. PATENT DOCUMENTS

| | | | |
|---|---|---|---|
| 2019/0088130 A1* | 3/2019 | Kapuria | ............ G06K 9/00845 |
| 2019/0185018 A1* | 6/2019 | Tao | ........................ B60W 50/14 |
| 2019/0367043 A1* | 12/2019 | Dotzler | ................ G05D 1/0061 |

* cited by examiner

*Primary Examiner* — Brian P Sweeney
(74) *Attorney, Agent, or Firm* — Lempia Summerfield Katz LLC

(57) ABSTRACT

The manual drive changing notification apparatus for a vehicle includes a communication unit configured to receive transmission data from a neighboring vehicle, a communication packet analyzer configured to analyze a communication packet of the transmission data to set a data format change level, a manual drive mode determination unit configured to analyze an autonomous driving environment of the neighboring vehicle based on the data format change level to determine a manual drive mode of a subject vehicle, a driver alarm strength setting unit configured to set a driver alarm strength for changing to the manual drive mode according to determination of the manual drive mode, and an alarm output unit configured to output an alarm according to the driver alarm strength.

20 Claims, 9 Drawing Sheets

(51) Int. Cl.
*H04W 4/46* (2018.01)
*B60W 50/00* (2006.01)
(52) U.S. Cl.
CPC ... *B60W 2050/143* (2013.01); *B60W 2556/65* (2020.02); *G05D 2201/0213* (2013.01); *H04W 4/46* (2018.02)

| PACKET ↓ | Level | 0 | 1 | 2 | 3 | 4 |
|---|---|---|---|---|---|---|
| | 0 | 0 | 0 | 1 | 2 | 4 |
| | 1 | 0 | 1 | 2 | 3 | 4 |
| | 2 | 1 | 1 | 2 | 3 | 4 |
| | 3 | 1 | 2 | 2 | 3 | 4 |
| | 4 | 3 | 3 | 4 | 4 | 4 |

WIRELESS →

MANUAL DRIVE CHANGING NOTIFICATION APPARATUS AND METHOD OF VEHICLE AND VEHICLE INCLUDING THE SAME

CROSS-REFERENCE TO RELATED APPLICATION

This application claims priority and the benefit of Korean Patent Application No. 10-2019-0047668, filed on Apr. 24, 2019, which is incorporated herein by reference in its entirety.

FIELD

The present disclosure relates to a manual drive changing notification apparatus of a vehicle, and a method of the manual drive changing notification apparatus of the vehicle.

BACKGROUND

The statements in this section merely provide background information related to the present disclosure and may not constitute prior art.

In general, driving of a vehicle means a process from when a driver or user starts the vehicle in order to drive the vehicle to when the driver or user turns the vehicle off.

An autonomous vehicle is defined as a vehicle autonomously traveling to a given destination without intervention of a driver, by recognizing a surrounding environment, determining a drive situation and controlling the vehicle.

Such an autonomous vehicle will become a future personal transportation which can reduce traffic accidents, increase transportation efficiency, reduce fuel consumption and increase driver convenience.

However, at Level 3 of an autonomous driving step, when an emergency occurs during autonomous driving, a driver needs to determine whether change to manual drive is necessary.

That is, in autonomous driving of Level 3, since the driver determines whether change to manual drive is necessary, the driver needs to always monitor a driving situation.

In particular, when a preceding vehicle changes lanes or rotates, it may be difficult for the driver of a subject vehicle to determine whether the preceding vehicle is in a manual drive mode or an autonomous drive mode.

When a subject vehicle which is autonomously driven in a platooning environment does not know change of a neighboring vehicle to a manual drive mode, a major accident is likely to occur.

The above information disclosed in this Background section is only for enhancement of understanding of the background of the present disclosure, and therefore it may contain information that does not form the prior art that is already known to a person of ordinary skill in the art.

SUMMARY

The present disclosure provides a manual drive changing notification apparatus and method of a vehicle, which is capable of increasing driver convenience and autonomous driving efficiency at Level 3, by providing manual drive mode changing notification of a subject vehicle based on a data format change level of a communication packet of transmission data received from a neighboring vehicle, and a vehicle including the same.

According to an aspect of the present disclosure, a manual drive changing notification apparatus for a vehicle such as a subject vehicle includes a communication unit configured to receive transmission data from a neighboring vehicle, a communication packet analyzer configured to analyze a communication packet of the transmission data to set a data format change level, a manual drive mode determination unit configured to analyze an autonomous driving environment of the neighboring vehicle based on the data format change level to determine a manual drive mode of the subject vehicle, a driver alarm strength setting unit configured to set a driver alarm strength for changing to the manual drive mode according to determination of the manual drive mode, and an alarm output unit configured to output an alarm according to the driver alarm strength.

In accordance with another aspect of the present disclosure, a manual drive changing notification method of a manual drive changing notification apparatus of a vehicle such as a subject vehicle, the manual drive changing notification method includes steps of receiving transmission data from a neighboring vehicle, analyzing a communication packet of the transmission data to set a data format change level, analyzing an autonomous driving environment of the neighboring vehicle based on the data format change level to determine a manual drive mode of the subject vehicle, setting a driver alarm strength for changing to the manual drive mode according to determination of the manual drive mode, and outputting an alarm according to the driver alarm strength.

In accordance with another aspect of the present disclosure, a computer-readable recording medium having recorded thereon a program for performing the manual drive changing notification method may perform a process provided by the manual drive changing notification method.

In accordance with another aspect of the present disclosure, a vehicle such as a subject vehicle includes a manual drive changing notification apparatus configured to provide a manual drive mode changing notification of the subject vehicle, and a manual/autonomous drive mode changing apparatus configured to change an autonomous drive mode of the subject vehicle to a manual drive mode according to control of a driver who has recognized the manual drive mode changing notification. The manual drive changing notification apparatus includes a communication unit configured to receive transmission data from a neighboring vehicle, a communication packet analyzer configured to analyze a communication packet of the transmission data to set a data format change level, a manual drive mode determination unit configured to analyze an autonomous driving environment of the neighboring vehicle based on the data format change level to determine the manual drive mode of the subject vehicle, a driver alarm strength setting unit configured to set a driver alarm strength for changing to the manual drive mode according to determination of the manual drive mode, and an alarm output unit configured to output an alarm according to the driver alarm strength.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
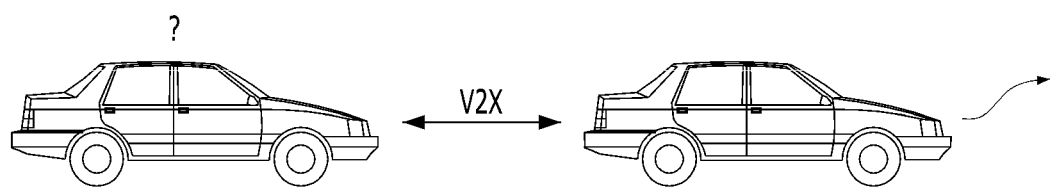
FIGS. 1A and 1B are views showing the concept of a manual drive changing notification apparatus of a vehicle according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software or a combination thereof.

Hereinafter, a manual drive changing notification apparatus and method, and a vehicle including the same applicable to forms of the present disclosure will be described in detail with reference to FIGS. 1 to 10.

Figure 1B:
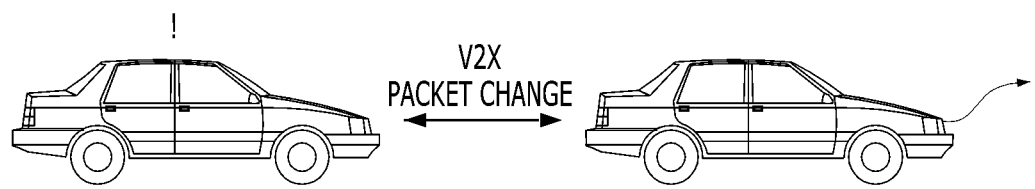

FIGS. 1A and 1B are views showing the concept of a manual drive changing notification apparatus of a vehicle according to a form of the present disclosure.

As shown in FIGS. 1A and 1B, an autonomously driven subject vehicle needs to determine whether a drive environment of a neighboring vehicle has been changed and notify a driver that change to manual drive is necessary.

As shown in FIG. 1A, an autonomously driven subject vehicle does not determine whether a preceding vehicle is autonomously or manually driven through general Vehicle-to-everything (V2X) communication and the driver needs to directly determine whether the preceding vehicle is autonomously or manually driven.

However, as shown in FIG. 1B, in the present disclosure, communication packet change of received data through V2X communication may be analyzed to automatically determine whether the preceding vehicle is autonomously or manually driven and the driver may be automatically notified that change to manual drive is necessary.

That is, in the present disclosure, direct information between vehicles is not used, but a determination is made that the drive mode of a neighboring vehicle has been changed when the data format of the neighboring vehicle is abnormal through monitoring of the data format of the neighboring vehicle, such that the driver is notified that change to manual drive is necessary.

In particular, the present disclosure assists the driver of the subject vehicle in determining whether change to manual drive is necessary during autonomous driving at Level 3.

Figure 2:
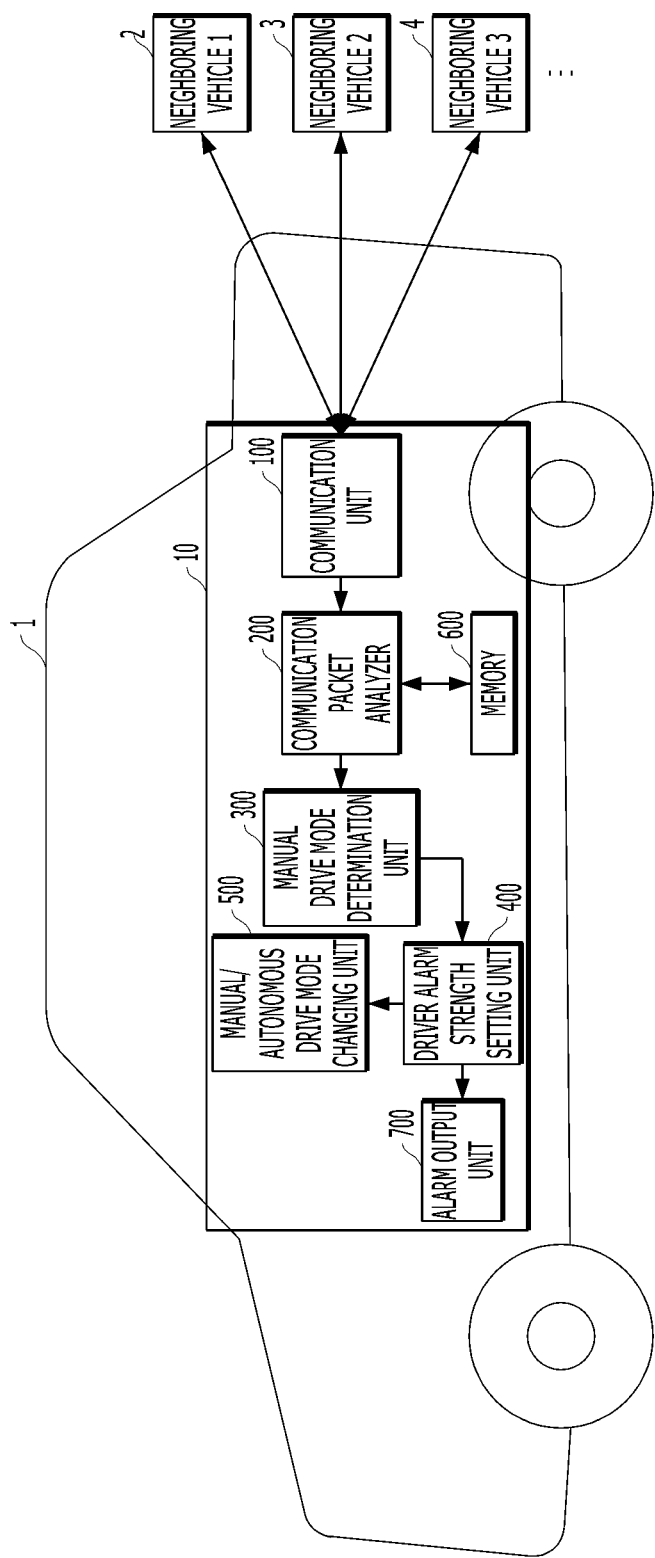
FIG. 2 is a block diagram showing a manual drive changing notification apparatus of a vehicle according to a form of the present disclosure.

FIG. 2 is a block diagram showing a manual drive changing notification apparatus of a vehicle according to a form of the present disclosure.

As shown in FIG. 2, a vehicle 1 may include a manual drive changing notification apparatus 10 for providing manual drive mode changing notification of the subject vehicle.

The manual drive changing notification apparatus 10 may include a communication unit 100 for receiving transmission data from neighboring vehicles, a communication packet analyzer 200 for analyzing the communication packets of the transmission data and setting data format change levels, a manual drive mode determination unit 300 for analyzing the autonomous driving environment of the neighboring vehicles based on the data format change levels and determining the manual drive mode of the subject vehicle, a driver alarm strength setting unit 400 for setting a driver alarm strength for changing to the manual drive mode according to determination of the manual drive mode, and an alarm output unit 700 for outputting an alarm according to the driver alarm strength.

The manual drive changing notification apparatus 10 may further include a memory 600 for storing the set data format change levels.

In addition, the manual drive changing notification apparatus 10 may include a manual/autonomous drive mode changing unit 500 for changing the autonomous driving of the subject vehicle to the manual drive mode under control of a driver who has recognized a manual drive mode change alarm. In some cases, the manual/autonomous drive mode changing unit 500 may be independently provided.

According to a form of the present disclosure, the components of the manual drive changing notification apparatus 10 will be described below in greater detail.

As shown in FIG. 2, the communication packet analyzer 200 may analyze the communication packets of the received transmission data when the autonomous driving of the subject vehicle starts.

That is, the communication packet analyzer 200 may set a monitoring range of neighboring vehicles when the autonomous driving of the subject vehicle starts, and analyze the communication packets of the transmission data received from neighboring vehicles located within the set monitoring range.

Accordingly, the communication packet analyzer 200 may define and register the data formats of the transmission data of the neighboring vehicles, when analyzing the communication packets of the transmission data.

For example, the data formats of first, second and third neighboring vehicles 2, 3 and 4 may be defined as follows.

The data format of the first neighboring vehicle 2 may be defined as abcd, the data format of the second neighboring vehicle 3 may be defined as ebf, and the data format of the third neighboring vehicle 4 may be defined as 1a3DZ.

The definition of the data format for autonomous cooperation drive may differ according to original equipment manufacturing (OEM) of the vehicle, and the configurations of assistance devices for safety drive may vary according to the optional configuration of the vehicle and thus the definition of the data format may vary. Accordingly, in the present disclosure, the field value of the data format is not desired.

In addition, when the data formats of the transmission data of the neighboring vehicles are defined and registered, if the transmission data of the neighboring vehicles has constant data formats in a predetermined reference number of times, the communication packet analyzer 200 may define the data formats as the data format of the neighboring vehicles.

Subsequently, the communication packet analyzer 200 may perform first analysis for wireless communication of the transmission data and second analysis for the packet of the transmission data, when the communication packets of the transmission data are analyzed.

The communication packet analyzer 200 may analyze at least one of whether a spectrum channel has been changed, whether a carrier frequency has been shifted, whether a spectral interferer is present or whether signal power is less than a reference value, when performing the first analysis for wireless communication of the transmission data.

In addition, the communication packet analyzer 200 may analyze at least one of non-static, field change, abrupt change, or unstable packet reception of the packet of the transmission data, when performing the second analysis for the packet of the transmission data.

Next, the communication packet analyzer 200 may set the data format change level to five levels including 0, 1, 2, 3 and 4 when the data format change level is set, without being limited thereto.

When the data format change level is set to five levels including 0, 1, 2, 3 and 4, the communication packet analyzer 200 defines data format change level 0 as unnecessity of change to the manual drive mode, and defines data format change levels 1, 2, 3 and 4 as necessity of change to the manual drive mode. As the data format change level increases in order of 1, 2, 3 and 4, a probability of necessity of change to the manual drive mode may increase.

For example, data format change level 1 may have a probability of necessity of change to the manual drive mode defined as about 1% to about 10%, data format change level 2 may have a probability of necessity of change to the manual drive mode defined as about 11% to about 40%, data format change level 3 may have a probability of necessity of change to the manual drive mode defined as about 41% to about 80%, and data format change level 4 may be defined as necessity of change to the manual drive mode.

When the data format change level is set, the communication packet analyzer 200 may determine whether a spectrum channel has been changed for wireless communication of the transmission data and set the data format change level to 0 when the spectrum channel has not been changed.

In some cases, when the data format change level is set, the communication packet analyzer 200 may determine whether a spectrum channel has been changed for wireless communication of the transmission data, determine whether a carrier frequency has been shifted for wireless communication of the transmission data when the spectrum channel has been changed, and set the data format change level to 1 when the spectrum channel has not been changed.

In another case, when the data format change level is set, the communication packet analyzer 200 may determine whether a spectrum channel has been changed for wireless communication of the transmission data, determine whether a carrier frequency has been shifted for wireless communication of the transmission data when the spectrum channel has been changed, determine whether a spectral interferer is present for wireless communication of the transmission data when the carrier frequency has been shifted, and set the data format change level to 2 when a spectral interferer is not present.

In another case, when the data format change level is set, the communication packet analyzer 200 may determine whether a spectrum channel has been changed for wireless communication of the transmission data, determine whether a carrier frequency has been shifted for wireless communication of the transmission data when the spectrum channel has been changed, determine whether a spectral interferer is present for wireless communication of the transmission data when the carrier frequency has been shifted, determine whether signal power for wireless communication of the transmission data is less than a reference value when a spectral interferer is present, and set the data format change level to 3 when the signal power is not less than the reference value.

In another case, when the data format change level is set, the communication packet analyzer 200 may determine whether a spectrum channel has been changed for wireless communication of the transmission data, determine whether a carrier frequency has been shifted for wireless communication of the transmission data when the spectrum channel has been changed, determine whether a spectral interferer is present for wireless communication of the transmission data when the carrier frequency has been shifted, determine whether signal power for wireless communication of the transmission data is less than the reference value when a spectral interferer is present, and set the data format change level to 4 when the signal power is less than the reference value.

In addition, when the data format change level is set, the communication packet analyzer 200 may determine whether the packet of the transmission data is non-static and set the data format change level to 0 when the packet of the transmission data is not non-static.

In some cases, when the data format change level is set, the communication packet analyzer 200 may determine whether the packet of the transmission data is non-static, determine whether there is a field change in the packet of the transmission data when the packet of the transmission data is non-static, and set the data format change level to 1 when there is no field change.

In another case, when the data format change level is set, the communication packet analyzer 200 may determine whether the packet of the transmission data is non-static, determine whether there is a field change in the packet of the transmission data when the packet of the transmission data is non-static, determine whether there is an abrupt change in the packet of the transmission data when there is a field change, and set the data format change level to 2 when there is no abrupt change.

In another case, when the data format change level is set, the communication packet analyzer 200 may determine whether the packet of the transmission data is non-static, determine whether there is a field change in the packet of the transmission data when the packet of the transmission data is non-static, determine whether there is an abrupt change in the packet of the transmission data when there is a field change, determine whether the packet of the transmission data is an unstable packet when there is an abrupt change, and set the data format change level to 3 when the packet of the transmission data is not the unstable packet.

In another case, when the data format change level is set, the communication packet analyzer 200 may determine whether the packet of the transmission data is non-static, determine whether there is a field change in the packet of the transmission data when the packet of the transmission data is non-static, determine whether there is an abrupt change in the packet of the transmission data when there is a field change, determine whether the packet of the transmission data is an unstable packet when there is an abrupt change, and set the data format change level to 4 when the packet of the transmission data is the unstable packet.

Subsequently, when the data format change level is set, the communication packet analyzer 200 may match the set data format change level to a corresponding neighboring vehicle and store the set data format change level in the memory 600.

Next, the manual drive mode determination unit 300 may collect a plurality of data format change levels from the communication packet analyzer 200, coordinate the collected data format change levels, table-map the coordinated data format change levels, determine the data format change levels of the neighboring vehicles based on table mapping, analyze the autonomous driving environments of the neighboring vehicles based on the determined data format change levels, and determine the manual drive mode of the subject vehicle.

Upon table-mapping the coordinated data format change levels, the manual drive mode determination unit 300 may differently set weights of the data format change level for the packet of the transmission data and the data format change level for wireless communication of the transmission data to perform table mapping.

For example, the manual drive mode determination unit 300 may set the weight of the data format change level for wireless communication of the transmission data to be higher than that of the data format change level for the packet of the transmission data.

In addition, upon table-mapping the coordinated data format change levels, the manual drive mode determination unit 300 may perform table mapping such that the data format change level for wireless communication of the transmission data increases in the right direction of the horizontal axis of the table map and the data format change level for the packet of the transmission data increases in a downward direction of the vertical axis of the table map.

Accordingly, the manual drive mode determination unit 300 may periodically manually or automatically perform update the table map generated by performing table mapping.

In some cases, the manual drive mode determination unit 300 may adaptively change the table map generated by performing table mapping according to the situation.

Upon setting the driver alarm strength for change to the manual drive mode, the driver alarm strength setting unit 400 may set the driver alarm strength to five levels including 0, 1, 2, 3 and 4, without being limited thereto.

Furthermore, upon setting the driver alarm strength to five levels including 0, 1, 2, 3 and 4, the driver alarm strength setting unit 400 defines driver alarm strength 0 as unnecessity of change to the manual drive mode, defines driver alarm strength 1 as necessity of slow change to the manual drive mode, defines driver alarm strength 2 as necessity of fast change to the manual drive mode, defines driver alarm strength 3 as necessity of fast change to the manual drive mode corresponding to emergency, and defines driver alarm strength 4 as necessity of immediate change to the manual drive mode.

Figure 7:
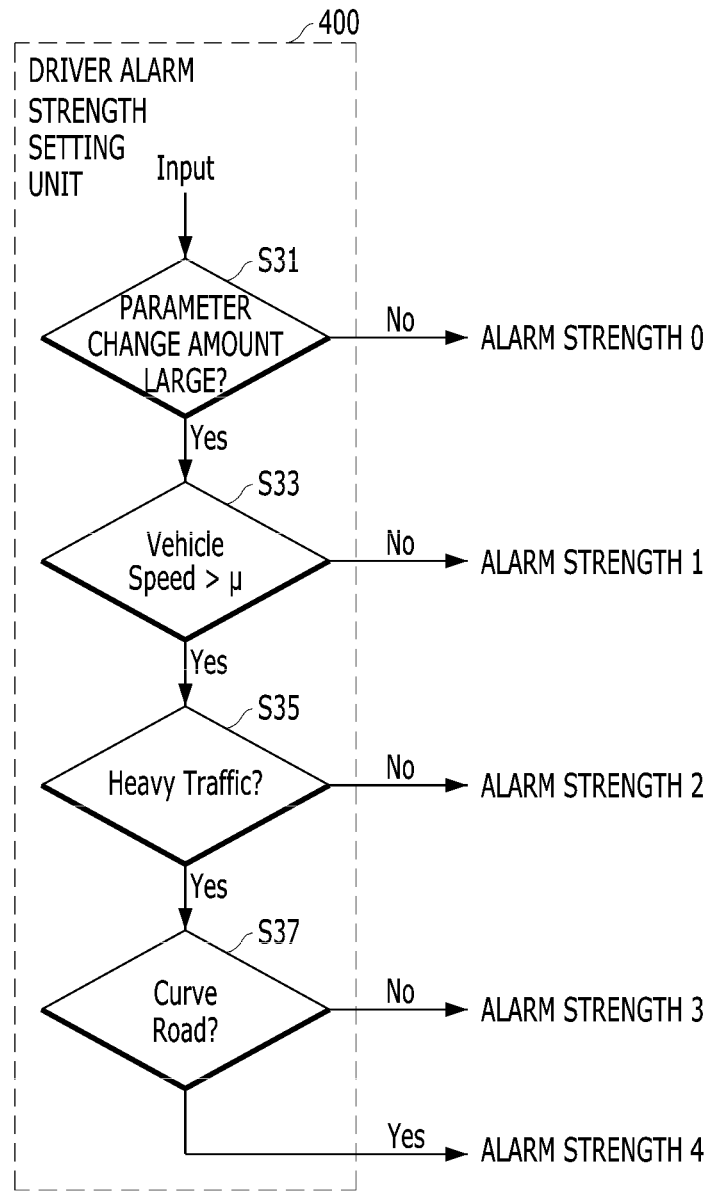
FIG. 7 is a flowchart illustrating a notification strength setting process of a driver alarm strength setting unit of FIG. 2.

As shown in FIG. 7, for example, the driver alarm strength setting unit 400 may determine whether a parameter change amount of an input value is greater than a reference change amount and set the driver alarm strength to 0 when the parameter change amount of the input value is not greater than the reference change amount.

In some cases, the driver alarm strength setting unit 400 may determine whether the parameter change amount of the input value is greater than the reference change amount, determine whether the speed of the subject vehicle is greater than a reference speed when the parameter change amount of the input value is greater than a reference change amount, and set the driver alarm strength to 1 when the speed of the subject vehicle is not greater than the reference speed.

In another case, the driver alarm strength setting unit 400 may determine whether the parameter change amount of the input value is greater than the reference change amount, determine whether the speed of the subject vehicle is greater than a reference speed when the parameter change amount of the input value is greater than a reference change amount, determine whether there is currently heavy traffic when the speed of the subject vehicle is greater than the reference speed, and set the driver alarm strength to 2 when there is currently no heavy traffic.

In another case, the driver alarm strength setting unit 400 may determine whether the parameter change amount of the input value is greater than the reference change amount, determine whether the speed of the subject vehicle is greater than a reference speed when the parameter change amount of the input value is greater than a reference change amount, determine whether there is currently heavy traffic when the speed of the subject vehicle is greater than the reference speed, determine whether a road is curved when there is currently heavy traffic, and set the driver alarm strength to 3 when the road is not curved.

In another case, the driver alarm strength setting unit 400 may determine whether the parameter change amount of the input value is greater than the reference change amount, determine whether the speed of the subject vehicle is greater than a reference speed when the parameter change amount of the input value is greater than a reference change amount, determine whether there is currently heavy traffic when the speed of the subject vehicle is greater than the reference speed, determine whether a road is curved when there is currently heavy traffic, and set the driver alarm strength to 4 when the road is curved.

In addition, upon outputting the alarm according to the driver alarm strength, the alarm output unit 700 (see FIG. 2) may not output the alarm when the driver alarm strength is 0, may output alarm sound when the driver alarm strength is 1, may output alarm sound and an alarm message when the driver alarm strength is 2, may output alarm sound, an alarm message and an audible warning when the driver alarm strength is 3, and may output alarm sound, an alarm message and an audible warning, and transmit an alarm to the neighboring vehicles when the driver alarm strength is 4.

In the present disclosure, the manual drive mode change alarm of the subject vehicle is provided based on the data format change levels of the communication packets of the transmission data received from the neighboring vehicles, thereby increasing driver convenience and autonomous driving efficiency at Level 3.

Accordingly, the driver is notified that the driving environments and patterns of the neighboring vehicles have been changed, thereby enabling the driver to determine necessity of change to the manual mode and increasing autonomous driving efficiency at Level 3.

In addition, in the present disclosure, the subject vehicle, which is autonomously driven, uses the data formats of the neighboring vehicles instead of the data of the neighboring vehicles. When an abnormal data format is transmitted instead of a registered data format in the normal autonomous driving situation of the subject vehicle, since the abnormal data format may affect the autonomous driving of the subject vehicle, the driver is notified of the abnormal data format in the form of a warning to enable the driver to determine necessity of manual driving.

Figure 3:
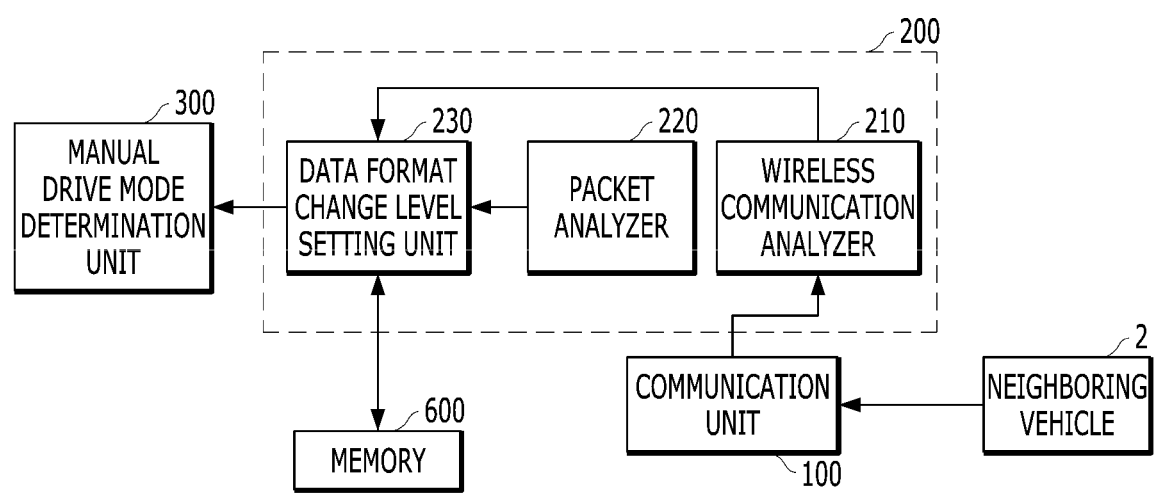
FIG. 3 is a block diagram showing a communication packet analyzer of FIG. 2.
Figure 4:
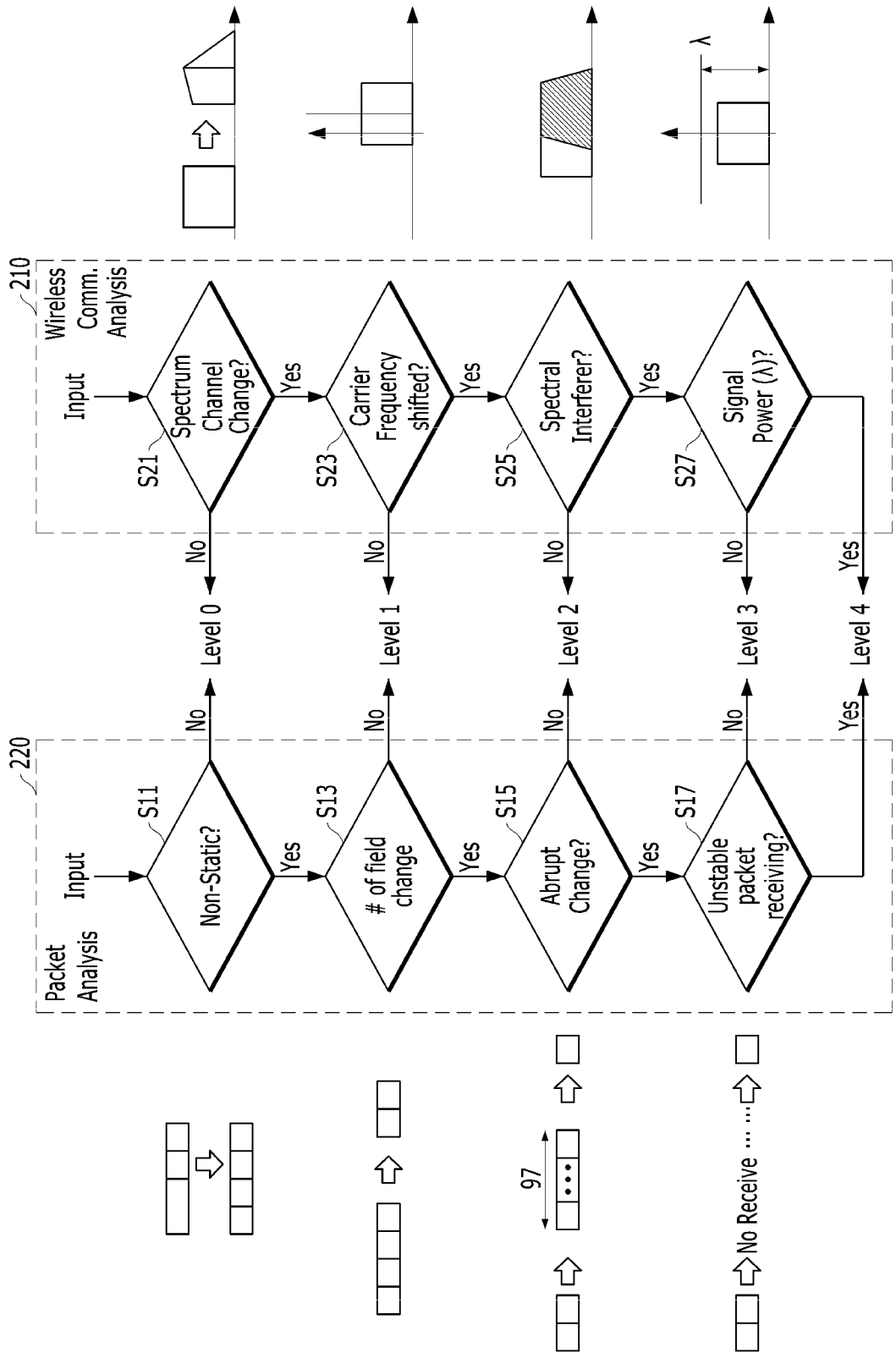
FIG. 4 is a flowchart illustrating a data format change level setting process of the communication packet analyzer of FIG. 2.

FIG. 3 is a block diagram showing a communication packet analyzer of FIG. 2, and FIG. 4 is a flowchart illustrating a data format change level setting process of the communication packet analyzer of FIG. 2.

As shown in FIG. 3, the communication packet analyzer may include a wireless communication analyzer 210 for analyzing wireless communication of the received transmission data, a packet analyzer 220 for analyzing the packet of the received transmission data, and a data format change level setting unit 230 for setting the data format change level based on the result of analyzing wireless communication of the transmission data by the wireless communication analyzer 210 and the result of analyzing the packet of the transmission data by the packet analyzer 220.

The wireless communication analyzer 210 may analyze at least one whether a spectrum channel has been changed, whether a carrier frequency has been shifted, whether a spectral interferer is present or whether signal power is less than a reference value, for wireless communication of the transmission data received from the communication unit 100.

The packet analyzer 220 may analyze at least one of non-static, field change, abrupt change, unstable packet reception of the packet of the transmission data, when performing the second analysis for the packet of the transmission data received from the communication unit 100.

The data format change level setting unit 230 may set the data format change level to five levels including 0, 1, 2, 3 and 4 when the data format change level is set, without being limited thereto.

When the data format change level is set to five levels including 0, 1, 2, 3 and 4, the communication packet analyzer 200 defines data format change level 0 as unnecessity of change to the manual drive mode, and defines data format change levels 1, 2, 3 and 4 as necessity of change to the manual drive mode. As the data format change level increases in order of 1, 2, 3 and 4, a probability of necessity of change to the manual drive mode may increase.

For example, data format change level 1 may have a probability of necessity of change to the manual drive mode defined as about 1% to about 10%, data format change level 2 may have a probability of necessity of change to the manual drive mode defined as about 11% to about 40%, data format change level 3 may have a probability of necessity of change to the manual drive mode defined as about 41% to about 80%, and data format change level 4 may be defined as necessity of change to the manual drive mode.

That is, level 0 means that there is no danger and the autonomous drive mode is maintained, level 1 has a low uncertainty and indicates that necessity of the manual drive mode is very low and there is no problem even when the autonomous drive mode is maintained at about 10% or less, level 2 has an intermediate uncertainty and indicates that necessity of the manual drive mode is intermediate and a degree of danger is low when the autonomous drive mode is maintained at about 10% to 40%, level 3 has a high uncertainty and indicates that necessity of the manual drive mode is high and a degree of danger is high when the autonomous drive mode is maintained at about 40% to 80%, and level 4 indicates that the degree of danger is very high and change to the manual drive mode is necessary.

As shown in FIG. 4, when the data format change level is set, the data format change level setting unit 230 may determine whether a spectrum channel has been changed for wireless communication of the transmission data based on the result of analysis of the wireless communication analyzer 210 (S21), and set the data format change level to 0 when the spectrum channel has not been changed.

When the data format change level is set, the data format change level setting unit 230 may determine whether a spectrum channel has been changed for wireless communication of the transmission data based on the result of analysis of the wireless communication analyzer 210 (S21), determine whether a carrier frequency has been shifted for wireless communication of the transmission data when the spectrum channel has been changed (S23), and set the data format change level to 1 when the carrier frequency has not been shifted.

When the data format change level is set, the data format change level setting unit 230 may determine whether a spectrum channel has been changed for wireless communication of the transmission data based on the result of analysis of the wireless communication analyzer 210 (S21), determine whether a carrier frequency has been shifted for wireless communication of the transmission data when the spectrum channel has been changed (S23), determine whether a spectral interferer is present for wireless communication of the transmission data when the carrier frequency has been shifted (S25), and set the data format change level to 2 when a spectral interferer is not present.

When the data format change level is set, the data format change level setting unit 230 may determine whether a spectrum channel has been changed for wireless communication of the transmission data based on the result of analysis of the wireless communication analyzer 210 (S21), determine whether a carrier frequency has been shifted for wireless communication of the transmission data when the spectrum channel has been changed (S23), determine whether a spectral interferer is present for wireless communication of the transmission data when the carrier frequency has been shifted (S25), determine whether the signal power for wireless communication of the transmission is less than a reference value when a spectral interferer is present (S27), and set the data format change level to 3 when the signal power is not less than the reference value.

When the data format change level is set, the data format change level setting unit 230 may determine whether a spectrum channel has been changed for wireless communication of the transmission data based on the result of analysis of the wireless communication analyzer 210 (S21), determine whether a carrier frequency has been shifted for wireless communication of the transmission data when the spectrum channel has been changed (S23), determine whether a spectral interferer is present for wireless communication of the transmission data when the carrier frequency has been shifted (S25), determine whether the signal power for wireless communication of the transmission is less than a reference value when a spectral interferer is present (S27), and set the data format change level to 4 when the signal power is less than the reference value.

In addition, when the data format change level is set, the data format change level setting unit 230 may determine whether the packet of the transmission data is non-static based on the result of analysis of the packet analyzer 220 (S11), and set the data format change level to 0 when the packet of the transmission data is not non-static.

When the data format change level is set, the data format change level setting unit 230 may determine whether the packet of the transmission data is non-static based on the result of analysis of the packet analyzer 220 (S11), determine whether there is field change in the packet of the transmission data when the packet of the transmission data is non-static (S13), and set the data format change level to 1 there is no field change.

When the data format change level is set, the data format change level setting unit 230 may determine whether the packet of the transmission data is non-static based on the result of analysis of the packet analyzer 220 (S11), determine whether there is field change in the packet of the transmission data when the packet of the transmission data is non-static (S13), determine whether there is an abrupt change in the packet of the transmission data when there is a field change (S15), and set the data format change level to 2 when there is no abrupt change.

When the data format change level is set, the data format change level setting unit 230 may determine whether the packet of the transmission data is non-static based on the result of analysis of the packet analyzer 220 (S11), determine whether there is field change in the packet of the transmission data when the packet of the transmission data is non-static (S13), determine whether there is an abrupt change in the packet of the transmission data when there is a field change (S15), determine whether the packet of the transmission data is an unstable packet when there is an abrupt change (S17), and set the data format change level to 3 when the packet of the transmission data is not the unstable packet.

When the data format change level is set, the data format change level setting unit 230 may determine whether the packet of the transmission data is non-static based on the result of analysis of the packet analyzer 220 (S11), determine whether there is field change in the packet of the transmission data when the packet of the transmission data is non-static (S13), determine whether there is an abrupt change in the packet of the transmission data when there is a field change (S15), determine whether the packet of the transmission data is an unstable packet when there is an abrupt change (S17), and set the data format change level to 4 when the packet of the transmission data is the unstable packet.

When the data format change level is set, the data format change level setting unit 230 may match the set data format change levels to the neighboring vehicles and store the data format change levels in the memory 600.

Figures 5, 6:
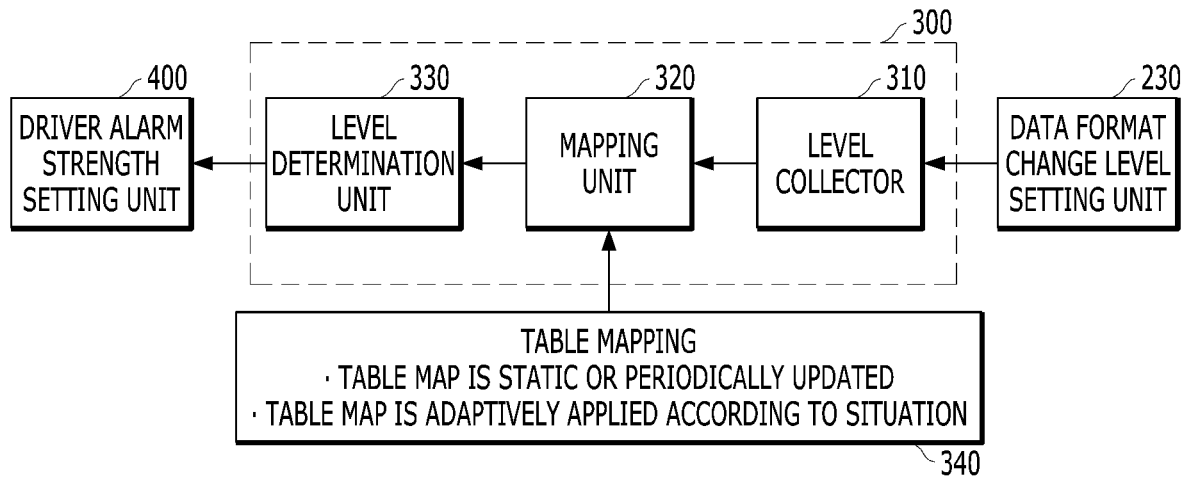
FIG. 5 is a block diagram showing a manual drive mode determination unit of FIG. 2.
FIG. 6 is a view showing a table map generated from the manual drive mode determination unit of FIG. 2.

FIG. 5 is a block diagram showing a manual drive mode determination unit of FIG. 2, and FIG. 6 is a view showing a table map generated from the manual drive mode determination unit of FIG. 2.

As shown in FIG. 5, the manual drive mode determination unit 300 may include a level collector 310 for collecting a plurality of data format change levels from the data format change level setting unit 230 and coordinating the collected data format change levels, a mapping unit 320 for table-mapping the data format change levels, and a level determination unit 330 for determining the data format change levels of the neighboring vehicles based on table mapping, analyzing the autonomous driving environment of the neighboring vehicles and determining the manual drive mode of the subject vehicle.

When the coordinated data format change levels are table-mapped, the mapping unit 320 may differently set the weights of the data format change level for the packet of the transmission data and the data format change level for wireless communication of the transmission data to perform table mapping.

For example, the mapping unit 320 may set the weight of the data format change level for wireless communication of the transmission data to be higher than that of the data format change level for the packet of the transmission data.

In addition, when the coordinated data format change levels are table-mapped, the mapping unit 320 may perform table mapping such that the data format change level for wireless communication of the transmission data increases in the right direction of the horizontal axis of the table map and the data format change level for the packet of the transmission data increases in the downward direction of the vertical axis of the table map.

For example, as shown in FIG. 6, the table map may be configured such that the data format change level for wireless communication of the transmission data increases in the right direction of the horizontal axis and the data format change level for the packet of the transmission data increases in the downward direction of the vertical axis, without being limited thereto.

In addition, the mapping unit 320 may make the table map, which is generated by performing table mapping, static or, in some cases, may periodically manually or automatically update the generated table map.

In some cases, the mapping unit 320 may adaptively change the table map generated by performing table mapping according to the situation.

FIG. 7 is a flowchart illustrating a notification strength setting process of the driver notification strength setting unit of FIG. 2.

As shown in FIG. 7, when the driver alarm strength for change to the manual drive mode is set, the driver alarm strength setting unit 400 may set the driver alarm strength to five levels including 0, 1, 2, 3 and 4.

When the driver alarm strength is set to five levels including 0, 1, 2, 3 and 4, the driver alarm strength setting unit 400 may define driver alarm strength 0 as unnecessity of change to the manual drive mode, define driver alarm strength 1 as necessity of slow change to the manual drive mode, define driver alarm strength 2 as necessity of fast change to the manual drive mode, define driver alarm strength 3 as necessity of fast change to the manual drive mode corresponding to emergency, and define driver alarm strength 4 as necessity of immediate change to the manual drive mode.

As shown in FIG. 7, the driver alarm strength setting unit 400 may determine whether a parameter change amount of an input value is greater than a reference change amount (S31) and set the driver alarm strength to 0 when the parameter change amount of the input value is not greater than the reference change amount.

In some cases, the driver alarm strength setting unit 400 may determine whether the parameter change amount of the input value is greater than the reference change amount (S31), determine whether the speed of the subject vehicle is greater than a reference speed when the parameter change amount of the input value is greater than a reference change amount (S33), and set the driver alarm strength to 1 when the speed of the subject vehicle is not greater than the reference speed.

In another case, the driver alarm strength setting unit 400 may determine whether the parameter change amount of the input value is greater than the reference change amount (S31), determine whether the speed of the subject vehicle is greater than a reference speed when the parameter change amount of the input value is greater than a reference change amount (S33), determine whether there is currently heavy traffic when the speed of the subject vehicle is greater than the reference speed (S35), and set the driver alarm strength to 2 when there is currently no heavy traffic.

In another case, the driver alarm strength setting unit 400 may determine whether the parameter change amount of the input value is greater than the reference change amount (S31), determine whether the speed of the subject vehicle is greater than a reference speed when the parameter change amount of the input value is greater than a reference change amount (S33), determine whether there is currently heavy traffic when the speed of the subject vehicle is greater than the reference speed (S35), determine whether a road is curved when there is currently heavy traffic (S37), and set the driver alarm strength to 3 when the road is not curved.

In another case, the driver alarm strength setting unit 400 may determine whether the parameter change amount of the input value is greater than the reference change amount (S31), determine whether the speed of the subject vehicle is greater than a reference speed when the parameter change amount of the input value is greater than a reference change amount (S33), determine whether there is currently heavy traffic when the speed of the subject vehicle is greater than the reference speed (S35), determine whether a road is curved when there is currently heavy traffic (S37), and set the driver alarm strength to 4 when the road is curved.

Accordingly, the alarm output unit may not output the alarm when the driver alarm strength is 0, may output alarm sound when the driver alarm strength is 1, may output alarm sound and an alarm message when the driver alarm strength is 2, may output alarm sound, an alarm message and an audible warning when the driver alarm strength is 3, and may output alarm sound, an alarm message and an audible warning, and transmit an alarm to the neighboring vehicles when the driver alarm strength is 4.

Figure 8:
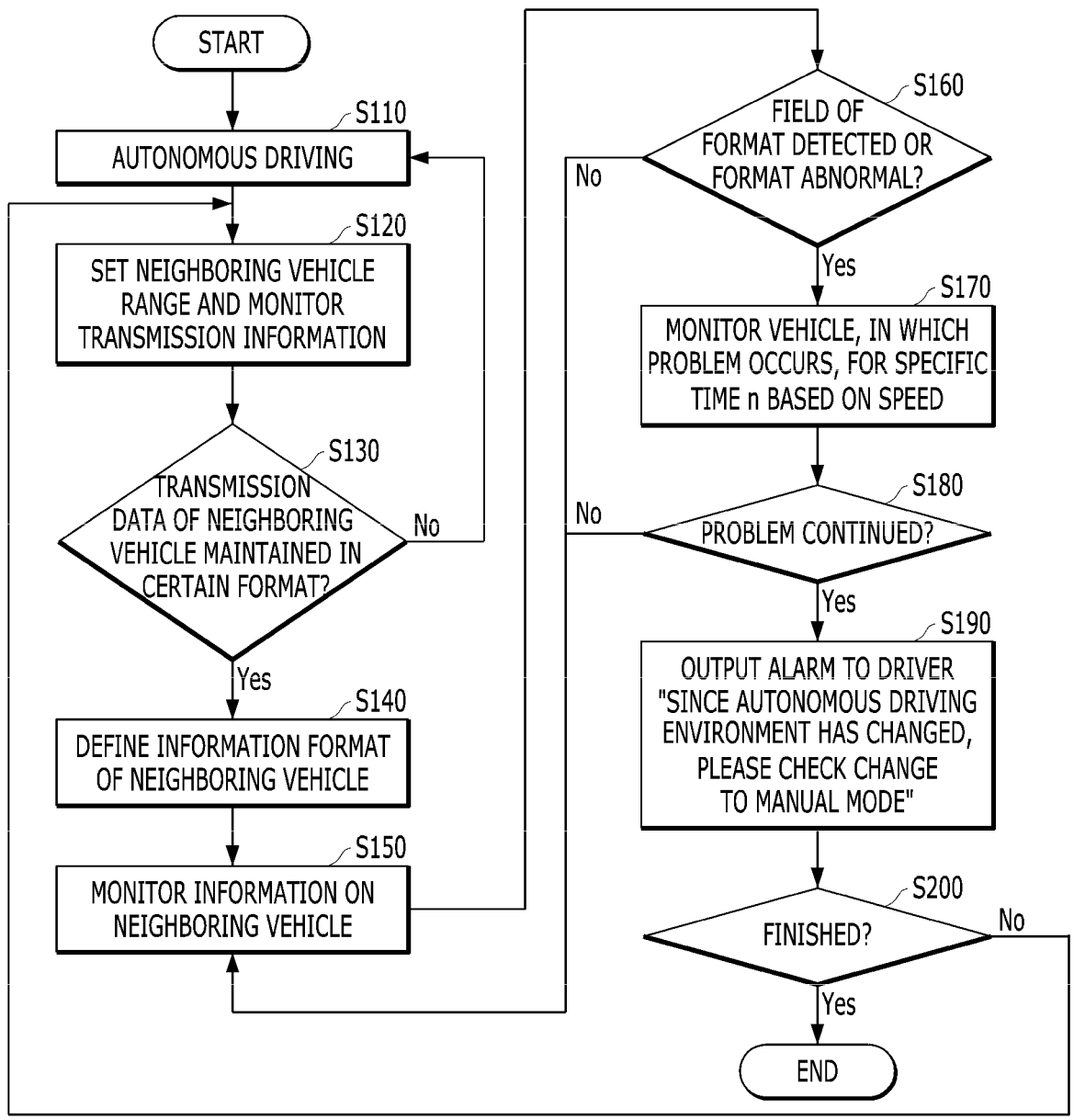
FIG. 8 is a flowchart illustrating a manual drive changing notification method of a manual drive changing notification apparatus of a vehicle according to a form of the present disclosure.

FIG. 8 is a flowchart illustrating a manual drive changing notification method of a manual drive changing notification apparatus of a vehicle according to a form of the present disclosure.

As shown in FIG. 8, in the present disclosure, when autonomous driving of the subject vehicle starts (S110), the monitoring range of the neighboring vehicles is set and the communication packets of the transmission data received from the neighboring vehicles located within the set monitoring range are analyzed (S120).

The communication packets of the transmission data are analyzed to determine whether the transmission data of the neighboring vehicles is maintained in certain formats (S130).

In addition, in the present disclosure, when the transmission data of the neighboring vehicles is maintained in certain formats, the data formats of the transmission data of the neighboring vehicles are defined and registered (S140).

Subsequently, the communication packets of the transmission data received from the neighboring vehicles are monitored (S150).

Next, in the present disclosure, the data formats of the transmission data of the neighboring vehicles and pre-registered data formats are compared to determine whether there is a change in data format (S160).

For example, in the present disclosure, a determination may be made as to whether there is a change in data format including whether a field of the data format is deleted or whether the data format is abnormal.

In the present disclosure, a neighboring vehicle having a change in data format is continuously monitored for a specific time based on the speed (S170).

Subsequently, in the present disclosure, a determination is made as to whether the neighboring vehicle having a change in data format continuously has a problem for the specific time (S180).

Next, in the present disclosure, when the neighboring vehicle having a change in data format continuously has the problem for the specific time, an alarm may be output to the driver of the subject vehicle (S190).

For example, an alarm message and an audible warning "Since the autonomous driving environment has changed, please check change to the manual mode" may be output.

In addition, in the present disclosure, whether a request for finishing notification of change to the manual drive mode is made is determined (S200) and the manual drive changing notification process may be finished when the request for finishing notification of change to the manual drive mode is made.

In the present disclosure, notification of change to the manual drive mode of the subject vehicle may be provided based on the data format change levels for the communication packets of the transmission data received from the neighboring vehicles, thereby increasing driver convenience and autonomous driving efficiency at Level 3.

That is, in the present disclosure, the driver is notified that the driving environments and patterns of the neighboring vehicles have been changed, thereby enabling the driver to determine necessity of change to the manual mode and increasing autonomous driving efficiency at Level 3.

In addition, in the present disclosure, the subject vehicle, which is autonomously driven, uses the data formats of the neighboring vehicles instead of the data of the neighboring vehicles. When an abnormal data format is transmitted instead of a registered data format in the normal autonomous driving situation of the subject vehicle, since the abnormal data format may affect the autonomous driving of the subject vehicle, the driver is notified of the abnormal data format in the form of a warning and determines necessity of manual driving.

Figure 9:
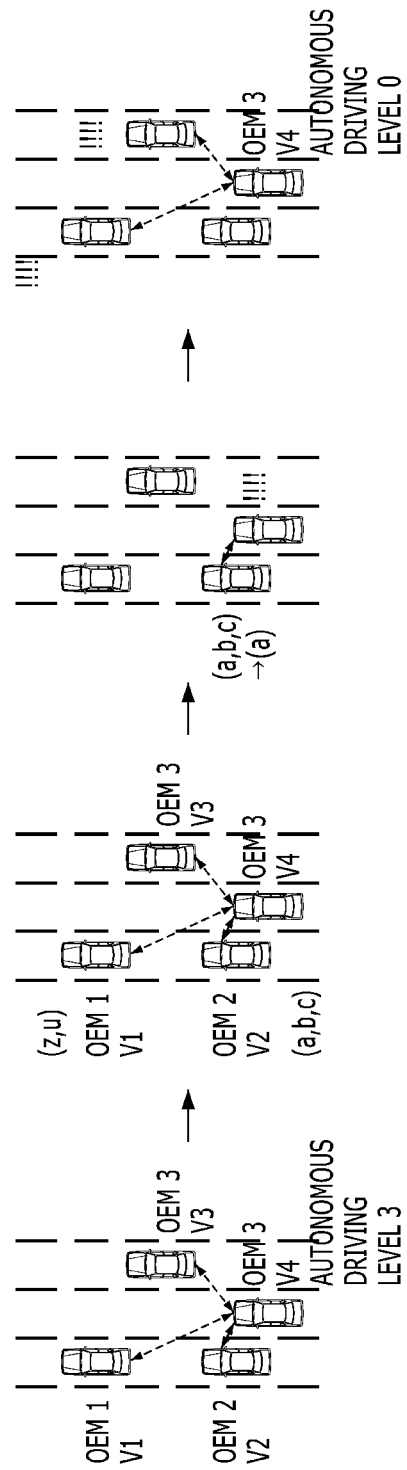
FIGS. 9 and 10 are schematic views illustrating a manual drive changing notification process of a manual drive changing notification apparatus of a vehicle according to a form of the present disclosure.
Figure 10:
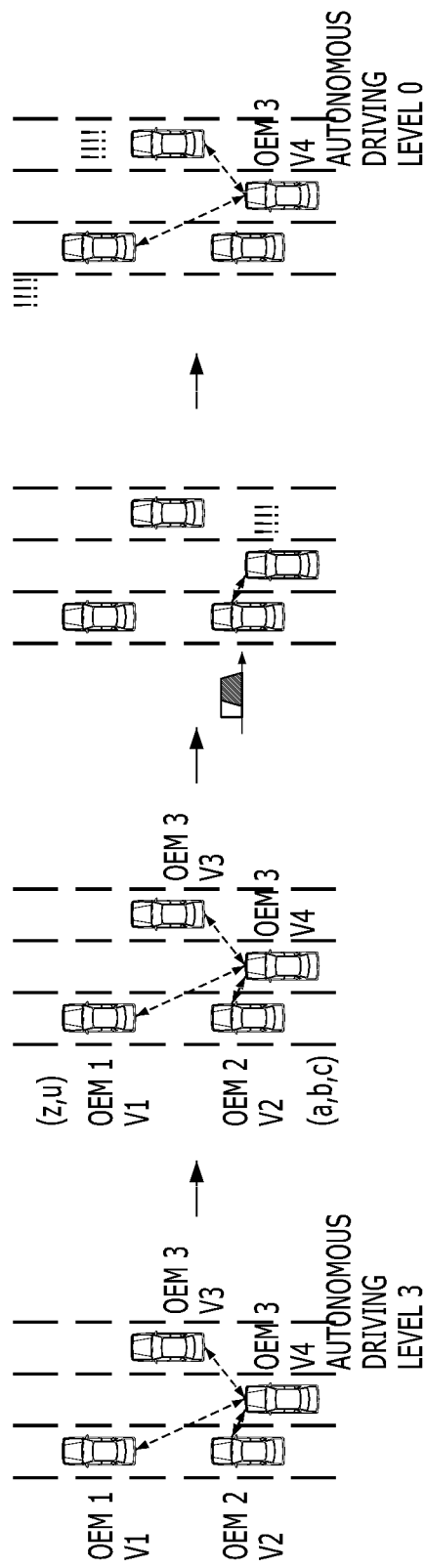

FIGS. 9 and 10 are schematic views illustrating a manual drive changing notification process of a manual drive changing notification apparatus of a vehicle according to a form of the present disclosure.

For example, as shown in FIG. 9, a first step is an autonomous drive maintaining step in which a subject vehicle V4 may receive information on autonomous driving level 3 of first, second and third neighboring vehicles V1, V2 and V3 through vehicle communication of about 5.9 GHz when traveling in a high-speed drive section at autonomous driving level 3.

Here, assume that the third neighboring vehicle V3 is manufactured according to the same OEM and the first, second neighboring vehicles V1 and V2 are manufactured according to other OEMs and thus the subject vehicle V4 can check information transmitted from the third neighboring vehicle V3 but cannot check information transmitted from the first and second neighboring vehicles V1 and V2.

A second step is a vehicle monitoring platooning step.

When the first neighboring vehicle V1 having data formats (z, u) and the second neighboring vehicle V2 having data formats (a, b, c) have data format change level 0 in which the communication packets are not changed and the third neighboring vehicle V3 has data format change level 0 in which the communication packets are not changed, the subject vehicle may be maintained in the autonomous drive mode because a total danger level is 0.

A third step is a step in which the mode of the second neighboring vehicle V2 is changed to the manual drive mode due to sensor failure and the communication pattern is rapidly changed from the data format (a, b, c) to (a).

A fourth step is a step in which the subject vehicle V4 recognizes change in communication pattern of the second neighboring vehicle V2 and thus current platooning is impossible.

Accordingly, the subject vehicle V4 may change data format change level 0 which is an autonomous driving level and notify the driver of necessity of change to the manual drive mode.

As another example, as shown in FIG. 10, a first step is an autonomous drive maintaining step in which a subject vehicle V4 may receive information on autonomous driving level 3 of first, second and third neighboring vehicles V1, V2 and V3 through vehicle communication of about 5.9 GHz when traveling in a high-speed drive section at autonomous driving level 3.

Here, assume that the third neighboring vehicle V3 is manufactured according to the same OEM and the first and second neighboring vehicles V1 and V2 are manufactured according to other OEMs and thus the subject vehicle V4 can check information transmitted from the third neighboring vehicle V3 but cannot check information transmitted from the first and second neighboring vehicles V1 and V2.

A second step is a vehicle monitoring platooning step.

When the first neighboring vehicle V1 having data formats (z, u) and the second neighboring vehicle V2 having data formats (a, b, c) have data format change level 0 in which the communication packets are not changed and the third neighboring vehicle V3 has data format change level 0 in which the communication packets are not changed, the subject vehicle may be maintained in the autonomous drive mode because a total danger level is 0.

A third step is a step in which the communication pattern of the second neighboring vehicle V2 is abruptly changed due to peripheral interference propagation.

A fourth step is a step in which the subject vehicle V4 recognizes change in communication pattern of the second neighboring vehicle V2 and thus current platooning is impossible.

Accordingly, the subject vehicle V4 may change data format change level 0 which is an autonomous driving level and notify the driver of necessity of change to the manual drive mode.

The manual drive changing notification method of the present disclosure may include receiving transmission data from neighboring vehicles, analyzing the communication packets of the transmission data to set the data format change levels, analyzing the autonomous driving environment of the vehicles based on the data format change levels to determine the manual drive mode of the subject vehicle, setting the driver alarm strength for change to the manual drive mode according to the determination of the manual drive mode, and outputting an alarm according to the driver alarm strength.

The step of analyzing the communication packets of the transmission data to set the data format change levels may include setting the monitoring range of the neighboring vehicles when the autonomous driving of the subject vehicle starts, analyzing the communication packets of the transmission data received from the neighboring vehicles located within the set monitoring range, and setting the data format change levels based on the analyzed communication packets of the transmission data.

At this time, in the step of analyzing the communication packets of the transmission data received from the neighboring vehicles located within the set monitoring range, the data format of transmission data of the neighboring vehicles may be defined and registered.

In the step of analyzing the communication packets of the transmission data to set the data format change levels, first analysis for wireless communication of the transmission data and second analysis for the packet of the transmission data may be performed when the communication packets of the transmission data are analyzed.

In the step of performing first analysis for wireless communication of the transmission data, at least one of whether a spectrum channel has been changed, whether a carrier frequency has been shifted, whether a spectral interferer is present or whether the signal power is less than a reference value for wireless communication of the transmission data may be analyzed.

In addition, in the step of performing second analysis for the packet of the transmission data, at least one of non-static, field change, abrupt change, and unstable packet reception of the packet of the transmission data may be analyzed.

The step of analyzing the autonomous driving environment of the neighboring vehicles based on the data format change level to determine the manual drive mode of the subject vehicle may include collecting the plurality of data format change levels from a communication packet analyzer, coordinating the collected data format change levels, table-mapping the coordinated data format change levels, determining the data format change levels of the neighboring vehicles based on table mapping, and analyzing the autonomous driving environment of the neighboring vehicles based on the determined data format change levels to determine the manual drive mode of the subject vehicle.

In the step of table-mapping the coordinated data format change levels, the weights of the data format change level for the packet of the transmission data and the data format change level for wireless communication of the transmission data may be differently set to perform table mapping.

For example, the weight of the data format change level for wireless communication of the transmission data may be set to be higher than that of the data format change level for the packet of the transmission data.

Additionally, the present disclosure relates to a computer-readable recording medium having recorded thereon a program for performing the manual drive changing notification method of the manual drive changing notification apparatus of the vehicle, which may perform the process provided by the above-described manual drive changing notification method.

Meanwhile, the vehicle according to one form of the present disclosure may include a manual drive changing notification apparatus for providing a manual drive mode changing notification of a subject vehicle, and a manual/autonomous drive mode changing apparatus for changing an autonomous drive mode of the subject vehicle to a manual drive mode according to control of a driver who has recognized the manual drive mode changing notification. The manual drive changing notification apparatus may include a communication unit for receiving transmission data from neighboring vehicles, a communication packet analyzer for analyzing the communication packets of the transmission data and setting data format change levels, a manual drive mode determination unit for analyzing the autonomous driving environment of the neighboring vehicles based on the data format change levels and determining the manual drive mode of the subject vehicle, a driver alarm strength setting unit for setting a driver alarm strength for changing to the manual drive mode according to determination of the manual drive mode, and an alarm output unit for outputting an alarm according to the driver alarm strength.

In a manual drive changing notification apparatus and method of a vehicle and a vehicle including the same according to at least one form of the present disclosure, the manual drive mode change alarm of the subject vehicle is provided based on the data format change levels of the communication packets of the transmission data received from the neighboring vehicles, thereby increasing driver convenience and autonomous driving efficiency at Level 3.

That is, in the present disclosure, the driver is informed that the drive environments and patterns of the neighboring vehicles have been changed, thereby enabling the driver to determine necessity of change to the manual mode and increasing autonomous driving efficiency at Level 3.

In addition, in the present disclosure, the subject vehicle, which is autonomously driven, uses the data formats of the neighboring vehicles instead of the data of the neighboring vehicles. When an abnormal data format is transmitted instead of a registered data format in the normal autonomous driving situation of the subject vehicle, since the abnormal data format may affect the autonomous driving of the subject vehicle, the driver is notified of the abnormal data format in the form of a warning to enable the driver to determine necessity of manual driving.

The disclosure can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, and optical data storage devices.

While the present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A manual drive changing notification apparatus for a vehicle such as a subject vehicle, the manual drive changing notification apparatus comprising:
    a communication unit including a processor configured to receive transmission data from a neighboring vehicle;
    a communication packet analyzer including a processor configured to analyze a communication packet of the transmission data received from the communication unit to set a data format change level;
    a manual drive mode determination unit including a processor configured to analyze an autonomous driving environment of the neighboring vehicle based on the data format change level to determine a manual drive mode of the subject vehicle;
    a driver alarm strength setting unit including a processor configured to set a driver alarm strength for changing to the manual drive mode according to determination of the manual drive mode; and
    an alarm output unit configured to output an alarm according to the driver alarm strength.

2. The manual drive changing notification apparatus according to claim 1, wherein the communication packet analyzer sets a monitoring range of the neighboring vehicle when autonomous driving of the subject vehicle starts and analyzes the communication packet of the transmission data received from the neighboring vehicle located within a set monitoring range.

3. The manual drive changing notification apparatus according to claim 1, wherein the communication packet analyzer defines and registers a data format of the transmission data of the neighboring vehicle, when the communication packet of the transmission data is analyzed.

4. The manual drive changing notification apparatus according to claim 1, wherein the communication packet analyzer performs first analysis for wireless communication of the transmission data and second analysis for the packet of the transmission data, when the communication packet of the transmission data is analyzed.

5. The manual drive changing notification apparatus according to claim 4, wherein the communication packet analyzer analyzes at least one of whether a spectrum channel has been changed, whether a carrier frequency has been shifted, whether a spectral interferer is present or whether signal power is less than a reference value for wireless communication of the transmission data, when performing the first analysis for wireless communication of the transmission data.

6. The manual drive changing notification apparatus according to claim 4, wherein the communication packet analyzer analyzes at least one of non-static, field change, abrupt change, or unstable packet reception of the packet of the transmission data, when performing the second analysis for the packet of the transmission data.

7. The manual drive changing notification apparatus according to claim 1, wherein the communication packet analyzer sets the data format change level to five levels including 0, 1, 2, 3 and 4 when the data format change level is set.

8. The manual drive changing notification apparatus according to claim 7, wherein, when the data format change level is set to five levels including 0, 1, 2, 3 and 4, the communication packet analyzer defines data format change level 0 as unnecessity of change to the manual drive mode, and defines data format change levels 1, 2, 3 and 4 as necessity of change to the manual drive mode, and a probability of necessity of change to the manual drive mode increases as the data format change level increases in order of 1, 2, 3 and 4.

9. The manual drive changing notification apparatus according to claim 1, wherein the communication packet analyzer includes:
    a wireless communication analyzer configured to analyze wireless communication of the received transmission data;
    a packet analyzer configured to analyze the packet of the received transmission data; and
    a data format change level setting unit configured to set the data format change level based on a result of analysis of the wireless communication of the transmission data by the wireless communication analyzer and a result of analysis of the packet of the transmission data by the packet analyzer.

10. The manual drive changing notification apparatus according to claim 1, further comprising a memory configured to store the set data format change level,
wherein, when the data format change level is set, the communication packet analyzer matches the set data format change level to a corresponding neighboring vehicle and stores the data format change level in the memory.

11. The manual drive changing notification apparatus according to claim 1, wherein the manual drive mode determination unit collects a plurality of data format change levels from the communication packet analyzer, coordinates the collected data format change levels, table-maps the coordinated data format change levels, determines the data format change levels of the neighboring vehicle based on table mapping, analyzes the autonomous driving environment of the neighboring vehicle based on the determined data format change level, and determines the manual drive mode of the subject vehicle.

12. The manual drive changing notification apparatus according to claim 1, wherein the manual drive mode determination unit includes:
a level collector configured to collect a plurality of data format change levels from a data format change level setting unit and to coordinate the collected data format change levels;
a mapping unit configured to table-map the data format change levels; and
a level determination unit configured to determine the data format change levels of the neighboring vehicle based on table mapping, to analyze the autonomous driving environment of the neighboring vehicle and to determine the manual drive mode of the subject vehicle.

13. The manual drive changing notification apparatus according to claim 1, wherein the driver alarm strength setting unit sets the driver alarm strength to five levels including 0, 1, 2, 3 and 4, when setting the driver alarm strength for changing to the manual drive mode.

14. The manual drive changing notification apparatus according to claim 13, wherein, when the driver alarm strength is set to five levels including 0, 1, 2, 3 and 4, the driver alarm strength setting unit defines driver alarm strength 0 as unnecessity of change to the manual drive mode, defines driver alarm strength 1 as necessity of slow change to the manual drive mode, defines driver alarm strength 2 as necessity of fast change to the manual drive mode, defines driver alarm strength 3 as necessity of fast change to the manual drive mode corresponding to emergency, and defines driver alarm strength 4 as necessity of immediate change to the manual drive mode.

15. The manual drive changing notification apparatus according to claim 1, wherein the alarm output unit does not output the alarm when the driver alarm strength is 0, outputs alarm sound when the driver alarm strength is 1, outputs alarm sound and an alarm message when the driver alarm strength is 2, outputs alarm sound, an alarm message and an audible warning when the driver alarm strength is 3, and outputs alarm sound, an alarm message and an audible warning, and transmits the alarm to the neighboring vehicle when the driver alarm strength is 4.

16. A manual drive changing notification method of a manual drive changing notification apparatus according to claim 1, the manual drive changing notification method comprising steps of:
receiving, by the communication unit, transmission data from a neighboring vehicle;
analyzing, by the communication packet analyzer, a communication packet of the transmission data to set a data format change level;
analyzing, by the manual drive mode determination unit, an autonomous driving environment of the neighboring vehicle based on the data format change level to determine a manual drive mode of the subject vehicle;
setting, by the driver alarm strength setting unit, a driver alarm strength for changing to the manual drive mode according to determination of the manual drive mode; and
outputting, by the alarm output unit, an alarm according to the driver alarm strength.

17. The manual drive changing notification method of claim 16, wherein the analyzing of the communication packet of the transmission data to set the data format change level includes steps of:
setting a monitoring range of the neighboring vehicle when autonomous driving of the subject vehicle starts;
analyzing the communication packet of the transmission data received from the neighboring vehicle located within a set monitoring range; and
setting the data format change level based on the analyzed communication packet of the transmission data.

18. The manual drive changing notification method of claim 16, wherein the analyzing of the autonomous driving environment of the neighboring vehicle based on the data format change level to determine the manual drive mode of the subject vehicle includes steps of:
collecting a plurality of data format change levels from the communication packet analyzer;
coordinating the collected data format change levels;
table-mapping the coordinated data format change levels;
determining the data format change levels of the neighboring vehicle based on the table-mapping; and
analyzing an autonomous driving environment of the neighboring vehicle based on the determined data format change level to determine the manual drive mode of the subject vehicle.

19. A computer-readable recording medium having recorded thereon a program for performing a manual drive changing notification method of a manual drive changing notification apparatus according to claim 1, the manual drive changing notification method comprising steps of:
receiving, by the communication unit, transmission data from a neighboring vehicle;
analyzing, by the communication packet analyzer, a communication packet of the transmission data to set a data format change level;
analyzing, by the manual drive mode determination unit, an autonomous driving environment of the neighboring vehicle based on the data format change level to determine a manual drive mode of the subject vehicle;
setting, by the driver alarm strength setting unit, a driver alarm strength for changing to the manual drive mode according to determination of the manual drive mode; and
outputting, by the alarm output unit, an alarm according to the driver alarm strength.

20. A vehicle comprising:
a manual drive changing notification apparatus configured to provide a manual drive mode changing notification of the vehicle; and
a manual/autonomous drive mode changing apparatus configured to change an autonomous drive mode of the vehicle to a manual drive mode according to control of a driver who has recognized the manual drive mode changing notification, wherein the manual drive changing notification apparatus includes:

a communication unit including a processor configured to receive transmission data from a neighboring vehicle;

a communication packet analyzer including a processor configured to analyze a communication packet of the transmission data received from the communication unit to set a data format change level;

a manual drive mode determination unit including a processor configured to analyze an autonomous driving environment of the neighboring vehicle based on the data format change level to determine the manual drive mode of the vehicle;

a driver alarm strength setting unit including a processor configured to set a driver alarm strength for changing to the manual drive mode according to determination of the manual drive mode; and an alarm output unit configured to output an alarm according to the driver alarm strength.

* * * * *